US006959809B2

(12) United States Patent
Begim

(10) Patent No.: US 6,959,809 B2
(45) Date of Patent: Nov. 1, 2005

(54) REUSABLE ENVIRONMENTALLY FRIENDLY PACKAGE AND STORAGE ALBUM

(75) Inventor: Moshe Yair Begim, Los Angeles County, CA (US)

(73) Assignee: AVC Corporation, Torrance, CA (US)

( * ) Notice: Subject to any disclaimer, the term of this patent is extended or adjusted under 35 U.S.C. 154(b) by 139 days.

(21) Appl. No.: 10/371,361

(22) Filed: Feb. 24, 2003

(65) Prior Publication Data
US 2004/0163990 A1 Aug. 26, 2004

(51) Int. Cl.$^7$ ............................................... B65D 69/00
(52) U.S. Cl. ....................... 206/232; 206/470; 206/473; 206/475
(58) Field of Search ............................... 206/232, 308.1, 206/387.13, 470, 471, 472, 473, 475, 459.5, 775–777, 782, 770, 771

(56) References Cited

U.S. PATENT DOCUMENTS

| 4,496,048 A | * | 1/1985 | Sykes ..................... 206/387.13 |
| 4,501,361 A | | 2/1985 | Rose |
| 4,635,797 A | * | 1/1987 | Bankier ....................... 206/472 |
| 4,717,021 A | * | 1/1988 | Ditzig ................... 206/387.13 |
| 4,778,051 A | * | 10/1988 | Schaub et al. ......... 206/387.13 |
| 4,869,364 A | | 9/1989 | Bray |
| 5,145,068 A | * | 9/1992 | Schmitz et al. ............. 206/472 |
| 5,748,608 A | | 5/1998 | Spector |
| 5,755,079 A | | 5/1998 | Peterson |
| 5,772,028 A | * | 6/1998 | Marsilio et al. ......... 206/387.1 |
| 5,775,512 A | | 7/1998 | Jones et al. |
| 5,839,575 A | * | 11/1998 | Blanco ....................... 206/232 |
| 5,950,821 A | * | 9/1999 | Moser ..................... 206/308.1 |
| 6,126,008 A | * | 10/2000 | Cox ........................... 206/471 |
| 6,168,015 B1 | | 1/2001 | Shimizu |
| 2002/0053526 A1 | | 5/2002 | Peterson |

* cited by examiner

Primary Examiner—Luan K. Bui
(74) Attorney, Agent, or Firm—Ronald M. Goldman

(57) ABSTRACT

A reusable package and storage album (1) displays and stores a multi-component product, combining the appearance of a blister pak with the security of a vacuformed clamshell package. Two sections (17 & 19) joined by hinges (43 & 45) to a spine (21), formed principally of plastic (11) and paperboard (9) materials, fold into a book or album-like structure to house the product components. Ample advertising space (9) is available on the exterior (3, 2, 21) and interior (23) surfaces for a layer of printed matter (13). The album type storage (17, 37, 19, 23) is helpful, discourages disposal of the packaging, which aids the environment, and allows manufacturer advertising and other printed information to persist beyond the sale. Hinges (43, 45) comprise an inverted rectangular U-shape in section in geometry. Windows (5, 7, 12) may be included to allow a view of the components. A window (5) formed in one album section (17) may be recessed to also prevent a component in the other album section (19) from flopping about when handling the package.

18 Claims, 2 Drawing Sheets

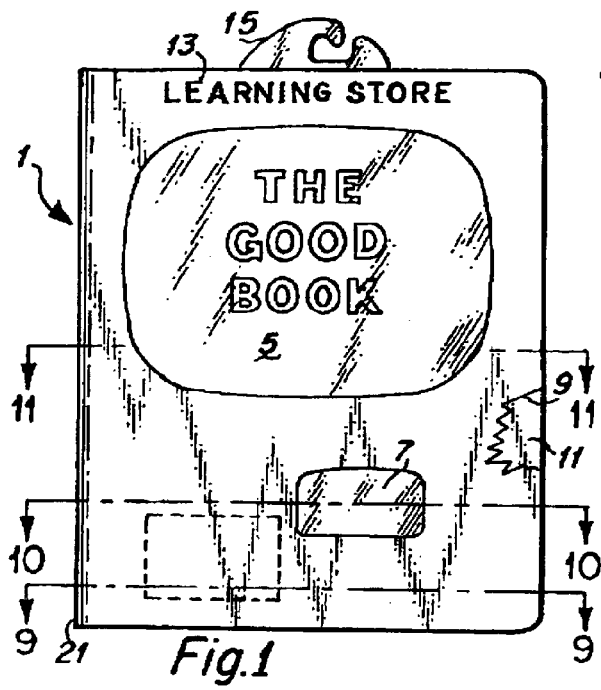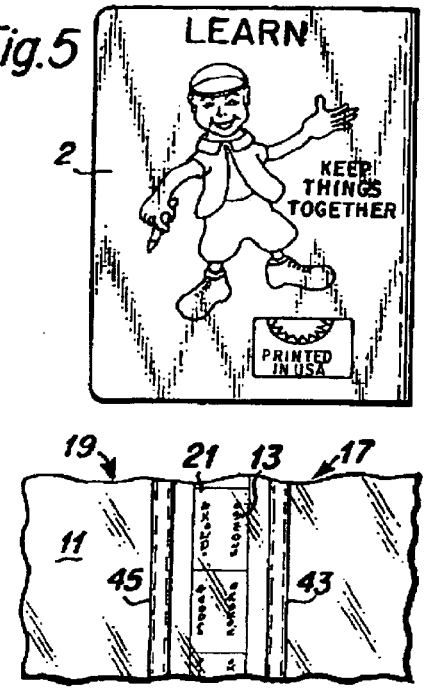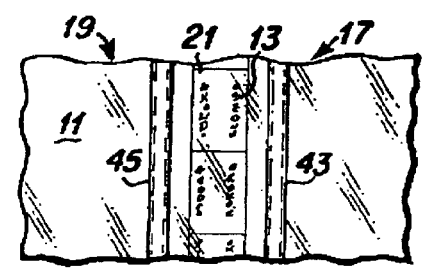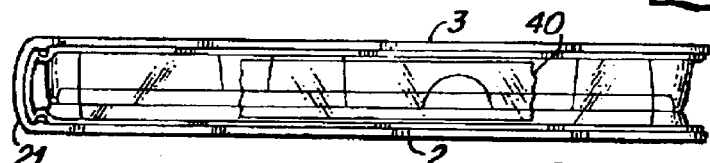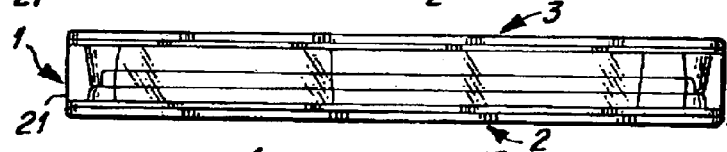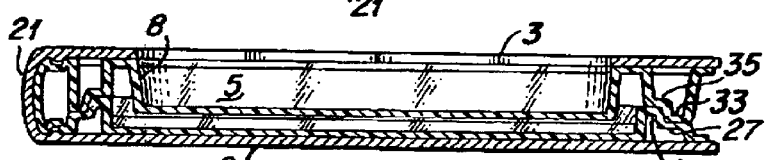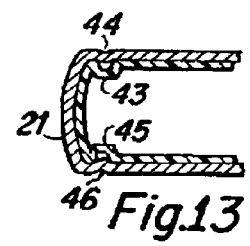

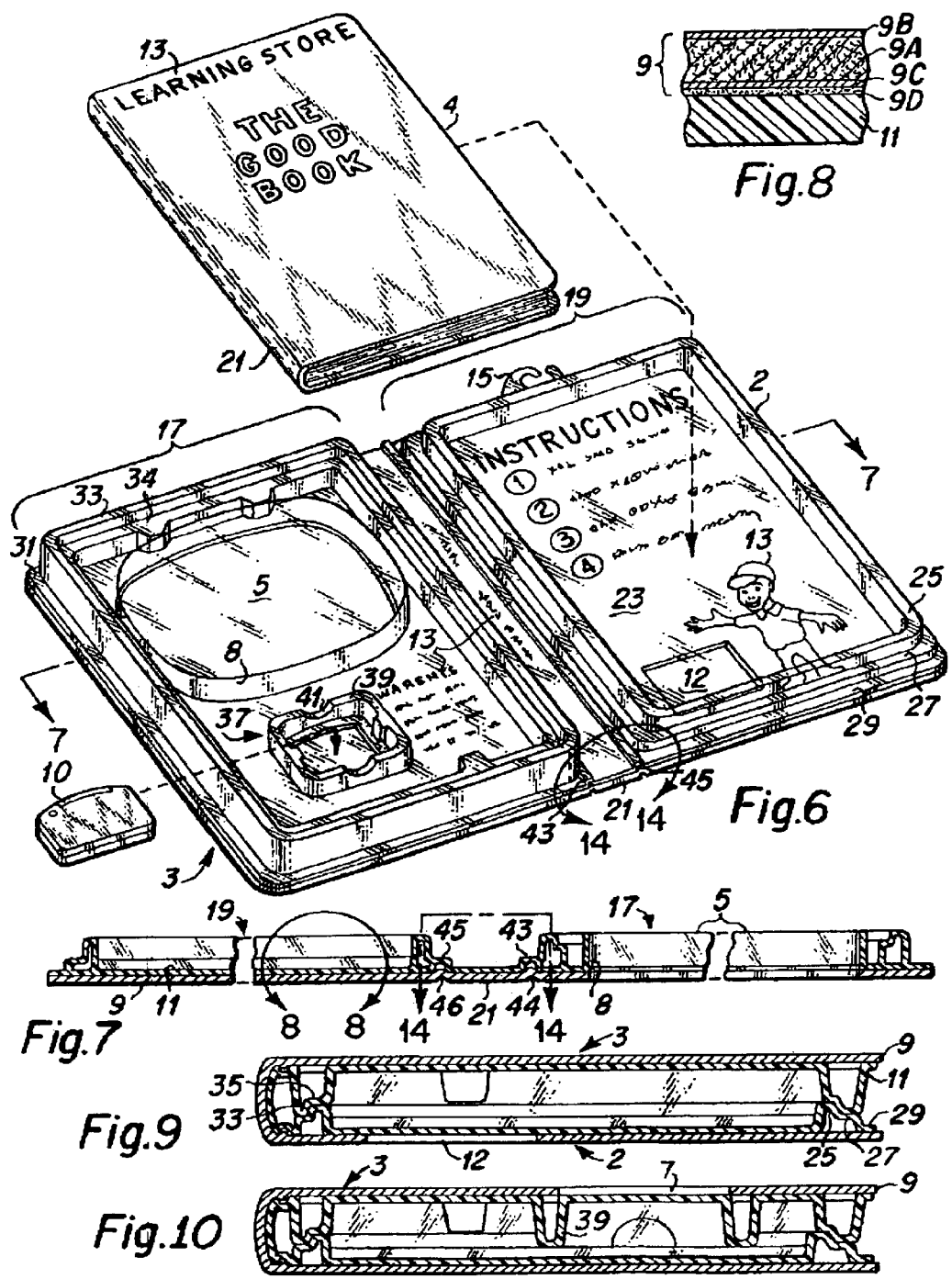

REUSABLE ENVIRONMENTALLY FRIENDLY PACKAGE AND STORAGE ALBUM

FIELD OF THE INVENTION

This invention relates to point of sale display and packaging of consumer product, and, more particularly, to a package that permits both in-store advertising and display of multi-component consumer product to induce purchase and provides convenient reusable storage for the product.

BACKGROUND

At retail, small low-cost consumer products, such as toys, novelty items, batteries, cameras, video games and the like are displayed in the retail store on shelves or hang from racks from which the consumer may remove one for inspection and/or purchase. Frequently those products are packaged in blister paks or in vacu-formed clamshell packages, widely known to the purchasing public. In the familiar blister pack the item is encased in a transparent plastic "bubble", a thin piece of transparent plastic that forms a shroud or dome like structure about most of the product, that is heat sealed or glued to a card of paper board or other fiber based printable material. The paper board card contains the printed or lithographed text and/or graphic material, such as the brand, model information, regulatory information and discretionary advertising, some of which may be viewed through the plastic bubble. An end of the cardboard and/or plastic material contains or is shaped as a hanger or contains an attached hanger so that the package may be hung from an extending rod of the display rack. The blister pak package is convenient for the retailer, since, for one, the bubble pak discourages pilfering by an errant customer or employee and generally allows the customer to visually inspect the item before making the purchase. In some such packages for some products a sheet of instructions is included.

To extract the article from the package following purchase, the purchaser needs to tear the plastic bubble away from the cardboard. Now destroyed, the bubble pak is discarded as waste. If an instruction sheet is included the sheet is typically discarded after first use or misplaced. And if the purchased article contains multiple items, such as an instruction booklet and camera, a book and crayons or multiple small toys, e.g. a multi-component article, the destroyed package can't be used to later store the items together. The purchaser is left to make other arrangements for storage after use.

Like the bubble pak, the vacuformed clamshell package is also widely known to consumers and, typically, permits the purchaser to visually inspect the packaged product. The vacuformed plastic case of the clamshell package is sealed along seams. As commonly known, it is not possible to easily remove the product (or components of a product) from that package with one's bare hands. Opening the package is somewhat of a struggle and requires use of a sharp heavy duty scissor or knife to cut apart the plastic and extract the product. The destroyed clamshell package is no longer useful and, like the bubble pak, is also discarded in the waste. Similarly, if the purchased item is a multi-component article, the destroyed package is unavailable to later store the items together and the purchaser needs make other arrangements for storage after use.

The difficulty experienced by the customer with the clamshell packages produces some complaints, particularly from those customers who may have been injured by the sharp edges exposed by cutting through the somewhat thick plastic of the vacuformed clamshell packages. For that reason alone one finds need for a package that can be opened more easily than those packages, particularly for those products intended for purchase by young mothers for their young children, even though that may somewhat compromise the anti-pilfering benefit of the prior packaging. As an advantage the present invention provides such a package, and retains the customer's ability to visually inspect the product and protects the manufacturer's interest in including advertising to induce a purchase.

A greater difficulty experienced by the customer is the lack of storage available for the multiple components of a product, once the package is destroyed to remove the product components. As previously noted the purchaser must make other arrangements for storage of the multiple components so that they do not become separated and lost. To store the parts of the product together the purchaser must exert additional effort to find or purchase a separate container to hold the components, a definite inconvenience and increase in expense for ones customer. Failing in that effort the product components are more likely to be separated and misplaced, which would halt use of the product. Even if one of the components is a simple instruction sheet, the instructions should be retained and stored. The loss of the instruction sheet can be problematic should one need to access the instructions a year or so after the product was first used.

Not only does the lack of storage capability produce an inconvenience for the purchaser, but the manufacturer of the product may find that his product fades prematurely because the product falls into non-use. The benefit of word of mouth advertising of a pleased customer is lost. As an advantage, the present invention adds value to the package for both the manufacturer and the customer, enabling the point of display package not only to achieve all of the advertising benefit of the foregoing prior packages (and more), but provides for storage of the product following the purchase. The present invention may be used and reused to store the product components.

Frequently a product manufacturer, such as a toy company, goes to great length in its package advertising, not only to induce the product purchase, but also to induce purchases of other products as well following the originally purchase, referred to as cross-sell advertising. That cross-sell advertising is lost once the package is discarded. As an advantage, the present invention retains that cross-sell advertising and results in that advertising being available to the consumer each time the product is removed from storage for use. With the present invention even the basic instructions may be preserved so that they can never be misplaced, lost or discarded.

The advent and rapid growth of the warehouse type retail stores perhaps accelerated the trend to rack type display of retail product in essentially pilfer proof packaging, such as the bubble pack and vacuum formed clamshell packages. With large quantities of merchandise and limited numbers of sales clerks available to assist the retail customer or watch over unpackaged small size merchandise it became unacceptable to permit unsupervised store patrons to open a package to inspect a product and/or retrieve one or more of the components in the package and possibly misplace them or, exercising self-help, remove the component as replacement for an earlier failed purchase, avoiding the long lines encountered in returning a failed product. As that pilfer proof packaging becomes more widespread, the quantity of discarded plastic packaging grows.

Discarding of plastic packaging materials appears of concern to many. Those materials are difficult to decompose.

As the quantity of such discarded materials mounts obvious difficulties are posed to the environment. By retaining the packaging materials for as long as possible the problem of disposal could be avoided or deferred long into the future. As a further advantage, the present invention induces the purchaser to save, use and re-use the plastic packaging; and, in that sense, the invention is considered environmentally friendly.

One feature of the described prior package structures that is of advantage to both manufacturer and consumer is that the components of a multi-component product are held in place in the package and cannot rattle when the package is shaken. Hence, the components are not subjected to extra shock during transport and the consumer will not hear a rattling sound on handling the package as would cause that consumer to think that something is wrong with the product. As a further advantage, the present invention also incorporates that anti-rattling feature.

Accordingly, a principal object of the present invention is to provide a package or container for retail product that has the appearance of a blister pak and the security of a clamshell type package.

A further object of the invention is to enhance the retail customer's awareness of a multi-component product prior to purchase in a secure package.

A still further object of the invention to reduce the volume of discarded plastic packages and thereby make plastic packages for product more environmentally friendly.

Another object of the invention is to induce retail consumers to refrain from discarding plastic packaging for a product following the product purchase.

Still another object of the invention is to enhance the value of point of sale packages for product by ensuring the consumer's retention and post-sale use of the packages.

An ancillary object of the invention is to enable the purchaser of product to remove product from the plastic packaging without destroying the package.

And a further ancillary object of the invention is to induce the customer to retain the advertising materials associated with the product following sale and prevent consumer misplacement of basic instructions for operation of the product.

ABSTRACT

In accordance with the foregoing objects and advantages, a reusable package and storage album displays and stores a multi-component product, combining the appearance of a blister pak with the security of a vacuformed clamshell package. Two sections joined by hinges to a spine fold into a book or album-like structure to house the product components. Ample advertising space is available on the exterior and interior surfaces for a layer of printed matter. The album type storage is helpful, discourages disposal of the packaging, which aids the environment, and allows manufacturer advertising and other printed information to persist beyond the sale. In accordance with the invention the two sections, spine and hinges are a unitary one-piece structure formed of one piece of plastic material. A treated paperboard sheet is attached to the outer surface of the housing sections and spine. The treated paperboard sheet contains a layer of printed material on each of the front and back surfaces and a layer of transparent paperboard-to-plastic bonding material on the front surface that faces the housing sections. Sealing means may join the two sections together to prevent tampering with the product prior to sale.

In accordance with a specific aspect of the invention the sealing means may be any of tape, a glue, a heat sealable glue, an ultraviolet light sealable glue and an ultrasonic weld.

In accordance with another specific aspect to the invention, the plastic material may be any of polyvinyl chloride, polypropylene, polyethylene and polystyrene. In accordance with a further aspect to the invention, the hinges comprise an inverted rectangular U-shape in section.

In accordance with a more specific embodiment of the invention, the package may include one or more windows to allow a view of the components without opening the package. In a still more specific aspect, a window formed in one section may be recessed to also prevent a component in the other section from flopping about when handling the package.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

BRIEF DESCRIPTION OF THE DRAWINGS

FIG. 1 illustrates an embodiment of the invention in a not-to-scale top side view;

FIG. 2 is the embodiment of FIG. 1 as viewed from the front side edge and in slightly larger scale, the opposite side thereto being a mirror image of the foregoing view;

FIG. 3 is the same embodiment in a side view as viewed from the right edge in the figure and in slightly larger scale;

FIG. 4 is the embodiment of FIG. 1 as viewed from the left side in the figure and in slightly larger scale;

FIG. 5 illustrates the embodiment of FIG. 1 from the back side and in slightly smaller scale;

FIG. 6 is a not-to-scale perspective view of the package fully open;

FIG. 7 is a partial section view taken along the lines 7—7 in FIG. 6 and enlarged in scale that illustrates the package, including the shape of the spine and hinge components, with the package open;

FIG. 8 is a partial section view taken along the lines 8—8 in FIG. 7, that illustrates a section of the treated paper board and plastic used in the embodiment of FIGS. 1 and 6;

FIG. 9 is a cross-section of the package embodiment taken along the lines 9—9 in FIG. 1 and slightly enlarged;

FIG. 10 is a cross-section taken along the lines 10—10 in FIG. 1;

FIG. 11 is a cross-section taken along the lines 11—11 in FIG. 1;

FIG. 12 is an enlarged section of the spine and hinges of the embodiment of FIG. 11 in the open condition and FIG. 13 is an enlarged section of that region in the closed condition; and FIG. 14 is a not-to-scale partial top view of a portion of the spine and hinges with the package in the open condition taken along the lines 14—14 in FIG. 6.

DETAILED DESCRIPTION OF THE PREFERRED EMBODIMENTS

Reference is made to FIGS. 1 and 2, illustrating the album or package 1 in top plan view and side view, respectively.

Album 1 is generally rectangular in shape and resembles an ordinary text book in geometry and size so as to conveniently fit on a bookshelf or other shelf for convenient storage. The exposed surface of the cover or top panel 3 is opaque to light. That surface is covered by an opaque treated printable material, suitably, treated paperboard material 9, that is attached to and overlies transparent plastic material 11 (as represented by the cutaway in the lower right of the figure) that defines the structure of the package, both of which are later herein more fully described. The top panel also contains transparent (e.g. light transmissive) openings or windows 5 and 7. Those windows are formed by cut-out openings or windows in treated paperboard material 9 exposing a portion of the underlying transparent plastic material 11 that serves as the window pane and admits light in the visual range to the interior of the package. The windows permit the contents of the package to be partially observed, such as the cover of a book 4, titled "the good book", generally represented in the figure, but which does not form part of the package.

The panel surface includes printers ink 13. The printers ink is arranged to define printed material, such as text and/or graphics symbols and background color, to provide advertising, brand names, contents description and other information and a pleasant appearance to the retail consumer. An example of such text is represented in the figure by the term "learning store", as it is not practical to display all of such text and graphics. As later discussed in connection with FIG. 6, the reverse side of the treated paperboard material 9 also contains printers ink that conveys information, color and/or graphics.

A hanger or hook 15, preferably formed integrally in a package wall, is included to permit the package to be hung on a conventional retail point-of-sale display rack. A tear line, not illustrated, in the plastic adjacent the base of the hook should allow removal of the hook following purchase of the article. Alternatively, in other embodiments the hook may be formed as a structure separate from the package and is attached to the package by tape or other adhesive that may conveniently be removed following the purchase of the product.

As illustrated in the lower side view of FIG. 2, package 1, shown closed, is of an album type structure containing sections 17 and 19 joined together by a spine 21 to which the two sections are hinged. As also illustrated in FIG. 2 and in the front edge view of the package in FIG. 3, like a book, the outer surfaces of top panel 3 and bottom panel 2 are flat. The end of the package opposite the end shown in FIG. 2, not illustrated, is a mirror image of the view of FIG. 2.

Spine 21 is joined to the respective sections by hinges, not illustrated in the figure and later herein described, that extend the length of the package height as presented in the side view of the closed package (opposite to the side of FIG. 3) illustrated in FIG. 4. The outer surface of spine 21, actually, as becomes apparent later in this description, a psuedo-spine, is also a treated paper board material that is scored along hinge lines and attached to the underlying spine of the plastic material, the latter of which is not visible in this view. As with the outer surface illustrated in FIG. 1, the treated paper board is opaque and contains printers ink 13 that defines textual information and/or graphics, as represented, as example, by the term "The Good Book."

The lower panel or back side of the package 2, opposite to that of FIG. 1, is illustrated in FIG. 5. The exposed surface of that side is also formed of the treated opaque printable paper board material used on the front cover and spine. In practice, the treated paper board surfaces are formed of a single sheet of treated paper board as described later herein in connection with FIG. 8. That treated paperboard is attached to the underlying plastic material of the wall of section 19 and also contains printers ink 13 on the outer surface. The printers ink on this panel also provides text and graphic symbols intended to provide information to a potential purchaser of the product. As later described, the opposite side surface of the foregoing paperboard surface also contains printers ink defining printed matter. A cut-out region in the treated paper board serves as an additional light transmissive window 12 to the underlying transparent plastic material of the package and through that plastic material into the interior of the package.

Package 1 is illustrated open and in perspective in FIG. 6 to which reference is made. In this view the package is open with the two housing sections 17 and 19 positioned on respective sides of spine 21. Hinges 43 and 45 respectively connect opposite elongate edges of spine 21 to an elongate edge of top panel 3 and bottom panel 2, respectively, joining the sections and permitting section 17 to pivot into mating engagement with section 19 and vice-versa to close the package as earlier illustrated in FIGS. 1–5.

The disclosed embodiment is designed to hold a multi-part child's toy that contains a book 4 (earlier partially viewed through window 5 in FIG. 1) and a plug-in ROM cartridge 6, an add-on accessory to a game or educational computer unit, not illustrated, which are shown in exploded view. The book fits loosely inside a recessed tray, receptacle or compartment 23 inside section 19. That compartment is defined by a bottom wall to the section and by a raised shoulder 25 that extends in a closed rectangular loop about the upper surface of package section 19. The book compartment is designed to be slightly greater in length and width dimensions than the corresponding dimensions of book 4 and is deep enough to receive the book so that the book easily fits inside the formed compartment and may be easily withdrawn when needed.

Another formed narrow shoulder 27, shorter in height than shoulder 25, extends about the outer periphery of shoulder 25 adjacent a formed flange 29 to the section. That shoulder engages a corresponding shoulder 34 in section 17, later herein described when the package is closed. Flange 29, which defines the outer edge of section 19, extends in a web about three sides of the section, but not along the spine 21. A like flange 31 is included in the other package section 17.

Section 19 also contains an additional light transmissive transparent window 12 through which a portion of the book may be viewed from the package exterior when the package is closed. The location of that window is determined by the designer who is guided by the particular information contained on the back cover of book 4 that is desirably displayed. As example, that information may be information that is required by regulation, such as the country in which the book was printed, or notices for the consumer, such as information on trademark ownership and/or copyright information on the book.

Section 17, on the left of the figure, also includes a flange 31, a first outer shoulder 33 upstanding from the base that extends in a closed rectangular loop about the section defining a four-sided compartment on top panel 3, and a second inner shoulder 35 upstanding from the base, adjacent to the former shoulder, that also extends in a closed rectangular loop defining an internal region in the section. In this section the outer shoulder 33 is greater in height than inner shoulder 35. Those shoulders are sized to mate with the corresponding shoulders of the other section to enable the package to close to the book-like shape (as was illustrated in FIGS. 2 and 3) and the side walls of the two outer shoulders 33 and 25 of the respective sections frictionally engage when the package is closed. That mating engagement tightly closes the package.

As better illustrated in this figure the pane of window 5 is recessed from the plane of the outer cover surface 3 and protrudes into the rectangular frame formed by shoulder 33. In addition to passing light through to the interior (and vice-versa), the flat surface of the plastic window also functions to prevent the book from tilting from the bottom wall of compartment 23 when the closed filled package is held upright (e.g. flopping), preventing the book from rattling in the closed package during transport or when the package is handled by a prospective purchaser. The distance by which the flat transparent plastic surface of the window protrudes from the plane of top cover 3, the depth, as defined by the window frame 8, is determined by the thickness of the installed book 4. The flat surface of window 5 should be at least contiguous with the cover of the installed book or may even press slightly against the flat surface of the book when the book is placed in receptacle 23 and the package is closed. That provides for a wider tolerance in manufacture and/or for slight change in book thickness.

When the surface of window 5 presses against the book, the inherent elasticity of the plastic material forming the window produces a slight pressure (e.g. compressive force) to more firmly hold the book in place in the compartment, while the reactive force produced thereby between sections 17 and 19 does not exceed the frictional strength of the frictional engagement between those two mating sections when the package is closed. As one appreciates, other embodiments of the package may be designed to hold articles other than a book and the size and/or shape of the recessed window may be varied accordingly, while permitting a portion of the other article to be visually inspected.

A pocket or receptacle 37 is located on the inside surface of section 17 which is designed to hold another component of the multi-component article. In this embodiment that receptacle is for holding the semiconductor ROM plug-in cartridge 10, which does not form part of the package. Pocket 37 is formed by a raised shoulder 39 on the inside surface of the section that extends in a closed loop. The inside surface of the shoulder defines a region that is of the same essential geometry of the of cartridge 10, but is slightly smaller in size so that cartridge 10 may be held in place. The cartridge must be pressed into the pocket and is frictionally held in place by the side walls of shoulder 39. The hollow walls of that shoulder, formed of the same thin plastic material previously described, exhibits sufficient flexibility to capture and hold the cartridge.

Two depressions 41 at diametrically opposite locations in that shoulder define finger holes permitting the user to grip cartridge 10 from the side with two fingers and pull the cartridge from the receptacle. Pocket 37 is located over window 7 with the transparent plastic material of that window serving also as the bottom wall of the receptacle. Thus, a purchaser is able to view the content of the receptacle from the exterior of the package.

Although the foregoing embodiment is intended for use with a two component product and contains only one pocket in section 17, the invention is not limited to that number of pockets. As those skilled in the art appreciate, in other embodiments of the invention intended to package a multi-component product that contains a greater number of components, additional pockets of the foregoing type (and additional windows associated with those additional pockets, may be formed in the section to hold (and display) those additional components.

Reference is made to FIG. 7 which is an inverted section view taken along the lines 7—7 in FIG. 6. The section view assists in a review of the manner of manufacturing the invention. The plastic portion 11 of the package is first considered. The preferred plastic material used in the preferred embodiment is polyvinylchloride ("PVC"). However, it should be understood that other less preferred plastic materials may be substituted. Thus the term plastic or plastic material should be construed to include not only PVC, but also polypropylene, polyethylene ("PET"), polystyrene and any other equivalent material that gives the housing sections a relatively rigid form and is used for packaging, whether existing or that may be developed hereafter. Briefly, transparent PVC is supplied by the manufacturer as a flat rolled sheet of PVC plastic of the desired thickness and size. Using conventional thermoforming processes the flat sheets are transformed using an appropriate mold and heat to permanently reshape the plastic material into the desired three-dimensional shape illustrated, including the recessed window, right and left sections, the spine and hinges previously described. The process of thermoforming plastic is known and has been used to form the vacuformed plastic packages, also sometimes referred to as thermoformed packages.

That process simultaneously produces the deep recesses or depressions on one side of the sheet that produce the hollow shoulders 25 and 27, 33 and 34, the recessed window 5, the hollow should 39 of the pocket, earlier described, that protrude from the opposite side of the sheet. That thermoforming process also produces the hinges 43 and 45. The foregoing three-dimensional structure is seen as an integral structure formed of one piece of plastic material. Once formed the structure is removed from the mold.

The manufacture of the treated paper board material 9 is next considered. Reference is made to the partial section view of FIG. 8 taken along the lines 8—8 in FIG. 7. This section view shows the layers of the treated paper board material 9 as attached to the formed plastic structure 11. Printable material 9A of the appropriate size and thickness is supplied to the printer who applies printer's ink to the front and reverse side of the paper board sheet, producing ink layers 9B and 9C. That ink prints the text, background color and graphics material supplied by the packaging artist for the front and reverse sides of the paper board. By printable material it should be understood that such term encompasses ordinary printing, lithography and any other printing process that applies ink (or dye), as example, to paper or paper board materials and the like. The printers ink is applied to define textual and graphics information for the consumer. Brand names, product features and graphic characters, as example, provided on the side of the paper board that is located outside of the container assist to induce the customer to inspect and purchase the article. On the reverse side of the paperboard the printer's ink may define additional information on product start up and use of the type that often is presented on a separate sheet of paper, product support information, and further use of brand names and graphic characters. On some portions of the paper board, the printer's ink may be a simple background color.

Once printing is completed, the sheets of the printed board are coated on the inside surface with a thin transparent layer of a heat sealable compound 9D or other adhesive that covers the printer's ink on that side. The layer of sealing compound is transparent so as to permit incident light to pass through and allow the printer's ink on layer 9C to receive incident light and show through. One such compound (also referred to as an ink) is the GV Series Vinyl Screen Ink, a vinyl lacquer, sold by the Azdar Company of Chicago, Ill. That UV material is heat sensitive and can bond the treated paper board with PVC when heat is applied with pressure.

Then the treated paper board material die cut to form the window openings 5, 7 and 12. That material is also scored along the lines of the two hinges that weakens the paper board material at those locations overlying the living hinges 43 and 45 formed in the plastic sheet and, when the treated paper board is bonded to the plastic, as next described, allows the paper board to fold more easily.

The next step is to attach the treated paper board 9 to the flat side of the thermoformed plastic material 11 as illustrated in FIG. 7. The printed and coated paper board is then properly aligned on the flat side of the thermoformed plastic with the heat sealable bonding coating 9C contacting the plastic 11 and the score lines 44 and 46 aligned with the respective hinges 43 and 45. The assembly is then placed in an oven where the heat sealing coating is activated and heat seals the treated paper board to the thermoformed plastic. As bonded to the thermoformed plastic 11, the treated paper board covers any opening or deep depression in that surface. The score lines 44 and 46 overlie and are aligned with the formed plastic hinges 43 and 45, but those formed plastic hinges remain detached from treated paper board 9.

The package is ready to be stuffed with the multi-component product. In the illustrated embodiment of FIG. 6, a book 4 is placed in the appropriate compartment or receptacle 23 in one section of the package and a ROM cartridge 10 is inserted into compartment 37 in the other section of the container. Section 17 of the package is then pivoted about the hinge and spine 21 and is forced into mating frictional engagement with the other section 19, closing the package.

The sections of the package may then be secured by a sealing device to prevent a customer from tampering with the product at retail. In one embodiment the sealing device may be a strip of plastic tape 40, shown in FIG. 3, which is then placed along one or more edges at which the two sections 17 and 19 abutt to provide a tamper evident seal. In alternative embodiments the two edges of the sections may be tacked with glue, provided with an ultrasonic weld, sealed with an ultra-violet sensitive or sealed with a heat sealing compound, all of which fall within the scope of the invention. As example, referring to FIG. 6 dots of ultra-violet sensitive glue or heat sealing component may be placed at the four corners of shoulder 33 in section 17. The section is folded over into mating engagement with section 19, enclosing the product components. Then the dots on the shoulder is exposed to UV light or heated in a heat chamber, depending upon which sealing material is employed. The dots then harden and fasten the two sections together. To access the package, the consumer need only insert a knife at the location of each dot and cut the bond at those locations. The sections may then be pivoted apart. As one appreciates, that is much simpler than when opening present clamshell type packages.

Gluing may be used as a less preferred alternative to heat sealing for permanently attaching the paper board to the plastic material, in which case a thin layer of transparent glue is applied to the printed paper board. Then the board is properly aligned on the plastic material of the package and pressed into place on the plastic material. Any convenient known transparent glue conventionally used in plastic to paper board attachment in packaging may be used.

The drawings of the section view of FIGS. 7 and 8 and those which follow in this specification are not to scale, particularly the thicknesses of the paper board material 9 and the plastic 11, the latter of which typically is greater in thickness. Reference is made to FIGS. 9, 10 and 11, which are sections taken along the lines 9—9, 10—10 and 11—11, respectively, in FIG. 1. As is evident from the section view of FIG. 9, when the package is closed the shoulder 33 and 35 of section 17 frictionally mate with the corresponding shoulders 27 and 25, respectively, of the other section 19. The openings and deep depressions in the surface of plastic 11 underlying paper board 9 produced when hollow shoulders 33 and 35 and shoulders 25 and 27 and the hollow shoulder to pocket 37 were formed in the thermoforming process are covered over by treated paper board 960 that the outer panel surfaces 2 and 3 are planar. The treated paper board 9 is flat and sufficiently rigid to provide a firm surface to cover those open portions of the outside surface of the two sections of the board overlying the deep indentations in the surface of the plastic material and gives the resultant structure an overall book-like or album like appearance and feel.

Reference is made to FIG. 10, which is a section taken along the lines 10—10 in FIG. 1. This figure show the hinge configuration when the package is closed, and shows pocket 37 and the section of hollow shoulder 39 that forms the pocket. Shoulder 39 is hollow. That hollow extends through the flat base portion of plastic material 11 producing a deep depression and opening in the surface that is covered over by treated paperboard 9. Reference is next made to FIG. 11, the section view taken along the lines 11—11 in FIG. 1. The protruding wall 8 of recessed window 5 is shown to penetrate from the one housing section into the other housing section, leaving clearance for the thickness of the intended book. The window forms a depression (e.g. opening) in the flat base portion of the plastic material.

FIGS. 12 and 13 are enlarged partial section views of the spine 21 and binges 43 and 45 with the package, respectively, open and closed. The hinges are shown to be of an inverted rectangular U-shape in cross section. When the book is closed, the stems of the U-shape should squeeze together slightly. The scoring 44 and 46 in the paperboard material 91s aligned with the hinges. Note is again made that the paperboard material, although bound to spine 21, is not bound to the plastic hinges 43 and 45. Reference is made to FIG. 14 which is a partial view of the spine and hinges taken along the lines 14—14 in FIG. 6 looking down on the spine. The hinges extend linearly forming an inverted rectangular channel along the spine of the container hingedly joining the spine to each of sections 17 and 19. As one appreciates the shape of the hinges is new and is particulaily effective when joining the album type sections so that the sections can be pivoted close to the book-like configuration when the sections are formed of any of the plastic materials, including PVC, earlier described.

The foregoing embodiment contained a recessed window 5 that pressed into contact with book 4 when the package was assembled with the product inside and closed. As those skilled in the art appreciate in other less preferred embodiments that do not require that feature a recessed window need not be included and only windows that are co-planar with the section surface, like window 7, would be used. In still other less preferred embodiments one may elect to include a single window or in still other embodiments, eliminate windows entirely.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification.

What is claimed is:

1. A reusable package and storage album for the plurality of components of a multi-component product, comprising:

first and second mating housing portions for fully enclosing said plurality of components of multi-component product, each said housing portion being connected to a spine by a hinge wherein said housing portions may be manually pivoted into and out of mating engagement;

said first housing portion including a first light transmissive window;

said second housing portion including a receptacle for loosely housing a first one of said plurality of components; wherein said housing portions, spine and hinges comprise an integral structure formed in one piece of plastic material and a layer of treated paper board material bonded to one surface of said integral structure;

said first light transmissive window being recessed from the outer surface of said first housing portion and protruding into the interior a sufficient amount to abut said first one of said plurality of components, wherein said first one of said plurality of components is visible through said window and is prevented from rattling in said package and storage album when said package and storage album is lightly shaken;

said first and second housing portions and said some containing printers ink on outside and inside surfaces thereof, said printers ink defining text and artwork; and wherein said treated paper board material comprises; a first layer of printer's ink, a layer of paperboard material, a second layer of printer's ink, and a layer of treated paper board material-to-plastic material bonding material.

2. A reusable package and storage album for the plurality of components of a multi-component product as defined in claim 1, wherein each said hinge is an inverted rectangular U-shape structure in cross section; wherein said treated paperboard material extends across the ends of the stems of said U-shape structure, and wherein said treated paperboard material includes two score lines, one associated with each said hinge, and each of said score fines overlying and extending the length of a respective one of said hinges.

3. A combined display package and storage container for a muiti-component product that contains at least first and second components that differ in size, comprising:

first and second housing sections, said first and second housing sections for mating to one another in frictional engagement to place said package in a closed condition and define an internal region to fully enclose and hold said multi-component product;

said first housing section for storing said first component and said second housing section for storing said second component;

a spine; and a pair of hinges;

said spine being hingedly attached to said two sections by said pair of hinges for permitting said first and second sections to be pivoted into mating frictional engagement to close said package and confine said multi-component product and, alternately, out of said mating frictional engagement to open said package, whereby said components of said multi-component product may be withdrawn from said package;

said first and second housing sections, said spine and said pair of hinges being integrally formed in one piece of transparent plastic material;

said first housing section including a first and second light transmissive windows, said first window being recessed from the outer side surface of said first section and protruding form the inside surface of said first section;

a sheet of treated paperboard material having a front side and a back side and being opaque to light, said backside of said paperboard sheet being attached to an outside surface of said first and second housing sections and said spine to cover the outer surfaces of said package;

said sheet of treated paperboard material including a plurality of openings there through, a respective one of said plurality of openings corresponding in size and geometry with a corresponding one of said first and second light transmissive windows of said first housing section and being aligned with and overlying said corresponding one of said light transmissive windows of said first housing section for permitting transmission of light into and out of said internal region of said package when said first and second housing sections are in mating engagement;

said sheet of treated paperboard material including a layer of printers ink on each of said front and back side at locations on each said front and back side overlying said first and second housing sections and said spine, said printers ink defining any of text and graphics, and said back side of said sheet of treated paperboard material further including a layer of treated paper board-to-plastic transparent bonding material;

said printers ink on said back side of said paperboard being visible through said transparent plastic material.

4. The combined display package and storage container for a multi-component product that contains at least first and second components that differ in size as defined in claim 3, and wherein said second housing section including a light transmissive window; wherein said sheet of treated paperboard material includes at least one opening that corresponds in size and geometry said window of said second housing section, said opening is aligned with and overlies said light transmissive windows of said second housing section to permit transmission of light into and out of said internal region of said package when said first and second housing sections are in mating engagement.

5. The combined display package and storage container for a multi-component product that contains at least first and second components that differ in size as defined in claim 3, wherein said treated paper board-to-plastic transparent bonding material comprises a thermal actuated adhesive.

6. The combined display package and storage container for a multi-component product that contains at least first and second components that differ in size as defined in claim 3, wherein said transparent sealing material comprises a glue.

7. The combined display package and storage container for a multi-component product that contains at least first and second components that differ in size as defined in claim 2, further including temporary attachment means for attaching said first and second housing sections together to prevent said housing sections from being pivoted relative to one another to separate said housing sections.

8. The combined display package and storage container for a multi-component product contains at least first and second components that differ in size as defined in claim 7, wherein said temporary attachment means comprises an adhesive tape.

9. The combined display package and storage container for a multi-component product that contains at least first and second components that differ in size as defined in claim 7, wherein said temporary attachment means comprises fused plastic tacking.

10. The combined display package and storage container for a multi-component product that contains at least first and second components that differ in size as defined in claim 3, wherein first light transmissive window comprises a recessed window that protrudes to a predetermined depth into said first housing section for blocking movement of said second component of said multi-component product toward said first housing section when said second component is installed in said second housing section and said package is closed.

11. The combined display package and storage container for a multi-component product that contains at least first and second components that differ in size as defined in claim 10, wherein said predetermined depth is sufficient to position said recessed window at least contiguous with said second component.

12. The combined display package and storage container for a multi-component product that contains at least first and second components that differ in size as defined in claim 11, wherein said predetermined depth is sufficient to position said recessed widow to press against said second component.

13. The combined display package and storage container for a multi-component product that contains at least first and second components that differ in size as defined in claim 10, wherein first housing portion includes a receptacle of holding said first component of said multi-component product; wherein said second light transmissive window is located beneath said receptacle and defines a bottom wall to said receptacle, whereby said first article is visible through said light transmissive window when said package is closed.

14. The combined display package and storage container for a multi-component product that contains at least first and second components that differ in size as defined in claim 10, wherein first housing portion includes a receptacle of holding said first component of said multi-component product; wherein said second light transmissive window is located beneath said receptacle and defines a bottom wall to said receptacle, whereby said first article is visible through said light transmissive window when said package is closed.

15. A display and storage package for a product, comprising:

first and second housing sections, said first and second housing sections for mating to one another in frictional engagement to place said package in a closed condition and define an internal region to hold said product;

a spine; and a pair of hinges;

said spine being attached to said two sections by said pair of hinges for permitting said first and second sections to be pivoted into mating frictional engagement to close said package and confine said product and, alternately, out of said mating frictional engagement to open said package, whereby said product may be withdrawn from said package;

said first and second housing sections, said spine and said pair of hinges being integrally formed in one piece of transparent plastic material;

each said hinges comprising an inverted rectangular U-shape geometry in section;

a sheet of treated paperboard material having a front side and a back side and being opaque to light, said backside of said paperboard sheet being attached to an outside surface of said first and second housing sections and said spine to cover the outer surface of said package;

said sheet of treated paperboard material including a layer of printers ink on each of said front and back side at locations on each said front and back side overlying said first and second housing sections and said spine, said printers ink defining any of text and graphics, and said back side of said sheet of treated paperboard material further including a layer of treated paper board-to-plastic transparent bonding material; and said printers ink on said back side of said paperboard being visible through said transparent plastic material.

16. A display and storage package for a product, comprising:

first and second housing sections, said first and second housing sections for mating to one another in frictional engagement to place said package in a dosed condition and define an internal region to hold said components of said product;

a spine; and a pair of hinges;

said spine being attached to said two sections by said pair of hinges for permitting said first and second sections to be pivoted into mating frictional engagement to close said package and confine said product and, alternately, out of said mating frictional engagement to open said package, whereby said product may be withdrawn from said package;

said first and second housing sections, said spine and said pair of hinges being integrally formed in one piece of transparent plastic material, said transparent plastic material comprising a member selected from the group consisting of: polyvinyl chloride, polypropylene, polyethylene and polystyrene; and each said hinges comprising an inverted rectangular U-shape geometry in section;

a sheet of treated paperboard material having a front side and a back side and being opaque to light, said backside of said paperboard sheet being attached to an outside surface of said first and second housing sections and said spine to cover the outer surfaces of said package;

said sheet of treated paperboard material including a layer of printers ink on each of said front and back side at locations on each said front and back side overlying said first and second housing sections and said spine, said printers ink defining any of text and graphics, and said back side of said sheet of treated paperboard material further including a layer of treated paper board-to-plastic transparent bonding material;

said printers ink on said back side of said paperboard being visible through said transparent plastic material; and sealing means for sealing said first and second housing sections together when said package is closed, said sealing means comprising any of a tape, a glue, a heat sealable glue, an ultraviolet light sealable glue and an ultrasonic weld.

17. A reusable package for a multi-component product containing a paper book and a plug-in cartridge, said paper book having a rectangular shaped cover and being of a predetermined thickness, comprising:

a first quadrilateral housing section;

said first housing section including a base, a stepped raised hollow shoulder projecting from said base and defining a rectangular region on said base, said base including an opening underlying said stepped raised hollow shoulder, and an outer flange, said flange extending about the periphery of said first section;

a second quadrilateral housing section;

said second quadrilateral housing section including a base, a stepped raised hollow shoulder projecting from said base and defining a rectangular region on said base, said base including an opening underlying said stepped raised hollow shoulder, and an outer flange, said flange extending about the periphery of said second housing section;

said stepped raised hollow shoulder of said first housing section being sized to matingly frictionally engage said stepped raised hollow shoulder of said second housing section when said package is closed a spine;

a first hinge joining a longitudinal edge of said spine to said flange of said first housing section;

a second hinge joining another longitudinal edge of said spine to said flange of said second housing section; and each said hinges comprising an inverted rectangular U-shape geometry in section; wherein said first and second housing sections may be pivoted relative to one another and relative to said spine to place said housing sections in face-to-face engagement with said spine positioned alongside said first and second housing sections to close said package;

said second housing section including a hollow raised shoulder forming a dosed loop, said hollow raised shoulder being located inside said rectangular region of said second housing section and defining an opening in said base underlying said shoulder and a first receptacle for receiving and frictionally engaging and holding said plug-in cartridge;

said rectangular region of said second housing portion defining a tray for loosely receiving said book;

said second housing section including a window portion recessed from the said base of said second housing section, said window portion being of a first predetermined area, said recessed surface of said window for providing a compression surface for pressing against said book when said book is received in said tray and said housing sections are in face to face frictional mating engagement;

said first and second housing section, said spine and said hinges being a unitary one-piece thermoformed structure formed from a sheet of transparent plastic material, said plastic material comprising a plastic member selected from the group consisting of polyvinyl chloride, polypropylene, polyethylene and polystyrene;

a sheet of treated paperboard material having a front side and a back side and being opaque to light, said backside of said paperboard sheet being bonded to an outside surface of said first and second housing sections and said spine to cover the outer surfaces of said package including said openings in said base underlying said stepped hollow raised shoulders in said first housing section and said opening in said base underlying said hollow shoulder defining said first receptacle;

said sheet of treated paperboard material including a plurality of openings there through;

said plurality of openings including a first opening corresponding in area, shape, alignment in said base, and overlying said recessed window of said first housing section to provide a light transmissive path through said first housing section;

said plurality of openings including a second opening corresponding in area, shape, alignment in said base, and underlying said first receptacle of said first housing section to provide a light transmissive path into said first receptacle;

said sheet of treated paperboard material including a layer of printers ink on each of said front and back side at locations on each of said front and back sides overlying said first and second housing sections and said spine, said printers ink defining any of text and graphics, and said back side of said sheet of treated paperboard material further including a layer of treated paper board-to-plastic transparent bonding material, wherein said said printers ink on said back side of said paperboard is visible through said transparent plastic material of said housing sections; and tamper proof sealing means connecting opposite shoulders of said first and second housing section together when said housing sections are in mating engagement to temporarily prevent said housing sections from being withdrawn from mating engagement.

18. A display and storage package for fully enclosing a product, comprising:

first and second housing sections;

a spine; and a pair of hinges;

each hinge in said pair of hinges comprising an inverted rectangular U-shape geometry in section;

said spine being attached to said two first and second housing sections by respective hinges of said pair of hinges for permitting said first and second sections to be pivoted into mating frictional engagement to close said package and define an internal region to completely confine said product and, alternately, out of said mating frictional engagement to open said package to expose said product, whereby said product may be withdrawn from said package;

said first and second housing sections defining a peripheral extending juncture between said housing sections when said housing sections are in mating frictional engagement;

said first and second housing sections, said spine and said pair of hinges being formed of transparent plastic material;

a sheet of paper material having a front side and a back side and being opaque to light, said sheet of paper material being positioned flat on a surface of said first and second housing sections and said spine for substantially covering said housing sections and said spine;

said sheet of paper material including a layer of printers ink on each of said front and back side thereof at locations overlying said first and second housing sections and said spine, said printers ink defining any of text and graphics;

said printers ink on at least one side of said paper material being visible through said transparent plastic material; and a tape for permanently attaching said first and second housing sections together when said first and second housing sections are in mating engagement, said tape extending a predetermined extent about a peripheral edge of said housing sections and overlying said peripherally extending Juncture between said first and second housing sections, said peripherally extending juncture defining a cutting line to guide a cutting instrument to cut through said tape for detaching said first and second housing sections from one another, permit said housing sections to be disengaged and pivoted to an open condition.

\* \* \* \* \*

UNITED STATES PATENT AND TRADEMARK OFFICE
CERTIFICATE OF CORRECTION

PATENT NO.   : 6,959,809 B2
DATED        : November 1, 2005
INVENTOR(S)  : Moshe Yair Begim It is certified that error appears in the above-identified patent and that said Letters Patent is hereby corrected as shown below:

Column 11,
Line 22, "said some" should read -- said spine --.

Signed and Sealed this

Third Day of January, 2006

JON W. DUDAS
*Director of the United States Patent and Trademark Office*